US006977027B2

United States Patent
Sharma et al.

(10) Patent No.: US 6,977,027 B2
(45) Date of Patent: Dec. 20, 2005

(54) ADDITIVE AND PROCESS FOR STICKY CONTROL IN RECYCLED PULPS

(75) Inventors: Shripal Sharma, Highlands Ranch, CO (US); Jorge Yordan, Parker, CO (US); Vicente Lasmarias, Highlands Ranch, CO (US); Jordan Kortmeyer, Parker, CO (US); Alexis Layne, Littleton, CO (US); Jason Reynolds, Denver, CO (US)

(73) Assignee: Luzenae America, Inc., Englewood, CO (US)

( * ) Notice: Subject to any disclaimer, the term of this patent is extended or adjusted under 35 U.S.C. 154(b) by 92 days.

(21) Appl. No.: 10/236,624

(22) Filed: Sep. 5, 2002

(65) Prior Publication Data

US 2003/0143144 A1 Jul. 31, 2003

Related U.S. Application Data (60) Provisional application No. 60/342,835, filed on Dec. 21, 2001.

(51) Int. Cl.⁷ .............................................. D21H 21/02
(52) U.S. Cl. .................................... 162/181.6; 162/199
(58) Field of Search .............................. 162/199, 181.6, 162/164.1, 164.6, 168.2, 168.3, 183; 106/469, 476

(56) References Cited

U.S. PATENT DOCUMENTS

| 4,964,955 | A | * | 10/1990 | Lamar et al. | 162/164.6 |
| 5,076,846 | A | * | 12/1991 | Buri et al. | 106/401 |
| 6,083,491 | A | * | 7/2000 | Mellul et al. | 424/63 |
| 6,565,646 | B1 | * | 5/2003 | Lasmarias et al. | 106/801 |

* cited by examiner

Primary Examiner—Peter Chin
(74) Attorney, Agent, or Firm—Sheridan Ross P.C.

(57) ABSTRACT

The present invention describes an additive which controls stickies formation and removes anionic trash from recycled old corrugated container furnish, old newsprint furnish, deinked pulp furnish, old magazine grade furnish, coated broke furnish, or thermomechanical pulp furnish. The present invention treats talc with either a tertiary or quaternary amine. The treated talc is then added to the pulp slurry and removes stickies by binding the stickies to the talc and neutralizes the anionic trash that may be present.

The present invention also describes a method for modifying talc particles involving contacting a tertiary or quaternary amine with talc particles. The present invention further describes a talc created by the process of contacting a tertiary or quaternary amine with talc particles. The present invention additionally describes a paper product having a modified talc filler wherein the modified talc filler has been contacted with a tertiary or quaternary amine.

24 Claims, 3 Drawing Sheets

ADDITIVE AND PROCESS FOR STICKY CONTROL IN RECYCLED PULPS

CROSS REFERENCE TO RELATED APPLICATIONS

This application claims priority to U.S. Provisional Patent Application Ser. No. 60/342,835 filed Dec. 21, 2001. The entire disclosure of the provisional application is considered to be part of the disclosure of the accompanying application and is hereby incorporated by reference.

FIELD OF THE INVENTION

The invention relates generally to a chemical additive and a process for making the additive, which can be used in heavy paper, cardboard or paperboard processes, even those using recycled pulp.

BACKGROUND OF THE INVENTION

In the field of making cardboard, heavy paper, or paperboard, recycled newsprint (ONP), old magazine grades (OMG), coated broke and old corrugated containers (OCC) are often used as ingredients. Contaminants such as waxes, hot melts, pressure sensitive adhesives, latex, or binder materials are usually present in these types of materials in varying quantities. Waxes, hot melts and pressure sensitive adhesives are generally referred to as stickies because they become separated from the pulp and stick to the paper making equipment and accessories. The stickies, if not treated or removed, can cause problems with running paper machines and paper quality defects.

In addition to the stickies, pulp suspensions also have colloidal anions, such as wood resins and fatty acids, referred to as anionic trash. Anionic trash needs to be controlled, otherwise, the trash will contribute to the deposit problems and will interfere with fiber-to-fiber bonding. The more problematic of the anionic trash is the wood resins and fatty acids since they form pitch or tacky deposits on the paper machine and related equipment, if not treated.

Many different substances are currently used for pitch and stickies control. Such substances include, but are not limited to chemicals (coagulants, polyamine, polydadmacs, polyethyleneimines, surfactants), talc, bentonite, precipitated calcium carbonate, and diatomaceous earth. Chemicals are only partially effective in controlling pitch and, in addition, are expensive additives. While chemicals are partially effective in controlling pitch, chemicals are generally ineffective in stickies control.

If stickies are not controlled, the paper machine must be shut down periodically to remove the stickies and render the equipment usable. Methods such as pressing, fabric wash-ups, and boil-outs are usually practiced to remove stickies. As one can imagine, shutting down the paper machine to remove stickies is an expensive and time consuming undertaking.

Pigments such as talc, bentonite, PCC and diatomaceous earth are also being used for their adsorptive properties. PCC can only be used in a neutral or alkaline pH environment since PCC dissolves in an acid pH environment to form lime and carbon dioxide. Diatomaceous earth, while able to be used in any pH environment, is very abrasive and has a tendency to adhere to parts of the paper making equipment. The use of diatomaceous earth requires the replacement and/or cleaning of various pieces of equipment more often than other types of adsorptive materials. Bentonite, like talc, can be used in any pH environment. However, unlike talc, the bentonite is less effective in controlling adhesives, waxes and hot melts.

Talc is naturally hydrophobic. Talc, in its natural state, has anionic sites at the edges of each particle. This anionicity makes talc (in its natural form) less effective than chemical polymers in dealing with pulp slurries with high levels of anionic trash since the anionic sites on the talc will repel the anionic trash present in the slurry or furnish. The treatment of talc with chemical polymers, specifically polydadmacs, has been described in at least U.S. Pat. No. 4,964,955 and U.S. patent application Ser. No. 60/327,638 filed on Oct. 5, 2001. While the polydadmac treated talc has been effective in some paper making applications, this form of cationic treatment does not appear to be as effective in controlling stickies in pulp slurries that contain high levels of waxes, hot melts and pressure sensitive adhesives.

Fillers such as talc, bentonite, and diatomaceous earth also impact other properties of the paper or board, especially when excessive amounts of the fillers are added to the pulp furnish. For instance, fillers can affect the strength of the board by negatively impacting fiber-to-fiber bonding. Fillers also reduce stiffness and can affect the coefficient of friction of the boards. A minimum value of a coefficient of friction is needed; otherwise, boards stacked on top of each other will not stack but will slide off the board located below it. This makes the boards hard to store and transport.

Thus, an additive, which can be added in amounts that do not affect other properties of the paper or boards, is needed which will effectively control stickies formation and remove anionic trash.

SUMMARY OF THE INVENTION

The present invention describes an additive which controls stickies formation and removes anionic trash from recycled old corrugated container furnish, old newsprint furnish, deinked pulp furnish, old magazine grade furnish, coated broke furnish, or thermomechanical pulp furnish. The present invention treats talc with a cationic polymer, typically either a tertiary or quaternary amine. While not wishing to be bound to any theory, Applicants believe that at certain amounts, the tertiary or quaternary amine will change only the edges of the talc particles from anionic to cationic. However, it is possible that the amine will change only small portions of the talc surface. The tertiary or quaternary amine is admixed with talc particles. The resultant treated talc has cationic sites for attracting anionic trash present in the pulp slurries and also has hydrophobic or oleophobic surface for attracting waxes, hot melts and pressure sensitive adhesives that would otherwise cause stickies. The treated talc is then added to the pulp slurry and removes stickies by binding the stickies to the talc and neutralizes the anionic trash that may be present.

The present invention also describes a method for modifying talc particles involving contacting a tertiary or quaternary amine with talc particles. The present invention further describes a talc created by the process of contacting a tertiary or quaternary amine with talc particles. The present invention additionally describes a paper product having a modified talc filler wherein the modified talc filler has been contacted with a tertiary or quaternary amine.

These and other objects, features, and advantages of the invention will become apparent from the following best mode description, the drawings and the claims.

BRIEF DESCRIPTION OF THE DRAWINGS

The figures which follow depict a preferred embodiment of the invention, and may depict various alternative embodiments. The invention is not limited to the embodiment or embodiments depicted herein since even further various alternative embodiments will be readily apparent to those skilled in the art. For the ease of the reader, like reference numerals in various drawing figures refer to identical structural elements or components.

DETAILED DESCRIPTION OF THE INVENTION

At the outset, it should be understood that this invention comprises an additive for use in a paper making process and a method for making such additive. The description which follows describes a preferred embodiment of the invention, and various alternative embodiments. It should be readily apparent to those skilled in the art, however, that various other alternative embodiments may be accomplished without departing from the spirit or scope of the invention.

The present invention treats talc with a cationic polymer, typically either a tertiary or quaternary amine. The discussion that follows focuses on the cationic polymer being a tertiary or quaternary amine. It should be recognized by one of skill in the art that other cationic polymers may work with the present invention as well. The amine family is a family of organic compounds that have at least one sp3 hybridized nitrogen bonded to as few as one hydrocarbon group and as many as four hydrocarbon groups. If one hydrocarbon group is bonded to the nitrogen it is classified as a primary amine. $CH_3$—$NH_2$ would be an example of a primary (1°) amine with one methyl group attached to the nitrogen atom. Since nitrogen is tri-valent, primary amines have two hydrogens bonded to the nitrogen.

Amines can have two hydrocarbon groups bonded to the nitrogen and would be classified as a secondary (2°) amine. $(CH_3)_2NH$ would be an example of a secondary amine. Amines may even have three hydrocarbon groups bonded to the nitrogen atom. Such amines would be classified as a tertiary (3°) amine. $(CH_3)_3N$ would be an example of a tertiary amine.

In addition, the nitrogen atom of the primary, secondary, and tertiary amines has a lone pair of electrons that is often in the presence of a more acidic substance capable of donating the lone pair in forming a fourth bonding pair. The use of the lone pair of electrons makes the nitrogen electron deficient and the nitrogen atom would then possess a formal charge of +1. Such a positively charged nitrogen would be classified as a quaternary amine. These are salt like and unlike the other classes of amines are not basic because they no longer have the lone pair of electrons. These quaternary amines are soluble in water whereas the other classes of amines are usually not very water soluble.

Although any quaternary amine can be used according to the present invention, the quaternary amine can be selected from one of the following amines: polydadmac or polyamine. The Examples of this application use a polyamine to demonstrate the effectiveness of the quaternary amines. The polyamine used has the chemical structure: PA molecules are linear. The molecular weight of the PA is approximately 1 million amu.

Although any tertiary amine can be used according to the present invention, an example of a suitable tertiary amine is polyethyleneimine. The Examples of this application use a polyethyleneimine (PEI) to demonstrate the effectiveness of the tertiary amines. PEI has the chemical structure:

PEI

PEI molecules are spherical. The molecular weight of the PEI is approximately 1 million amu. In acidic conditions, the charge density ($\mu$eq/g) of PEI is higher than the tertiary amines. However, at alkaline pH of 9 or above, the PEI will lose some of its charge. Thus, if using a tertiary amine, the pH of the solution should be monitored so that the pH does not become alkaline enough to cause the PEI to lose its charge.

The addition of the quaternary or tertiary amine to a slurry of talc particles will change portions of the surfaces of the talc particles from anionic to cationic. The addition of the amine to the talc particles can take any suitable form. For example, in some situations, it may be advantageous to spray the amine on talc powder or pellets. In others, it may be desirable to admix the amine with talc particles. The amount of quaternary or tertiary amine added to the talc particles is controlled to ensure that the excess amine will not change the entire surface of the talc particles since it is important to preserve at least some of the hydrophobic nature of the talc particles. This control of the amount of added amine will preserve the hydrophobicity of the talc's surface for attracting the stickies while maximizing the talc's attractiveness to anionic trash present in the pulp furnish.

In order to perform the experiments described in the Examples of this application, a pulp mixer such as those typically used in the paper making industry was utilized. A mixing apparatus, called a dispermat, or Kitchen-Aid mixer, has a stirrer that attaches to the mixer.

Figure 1:
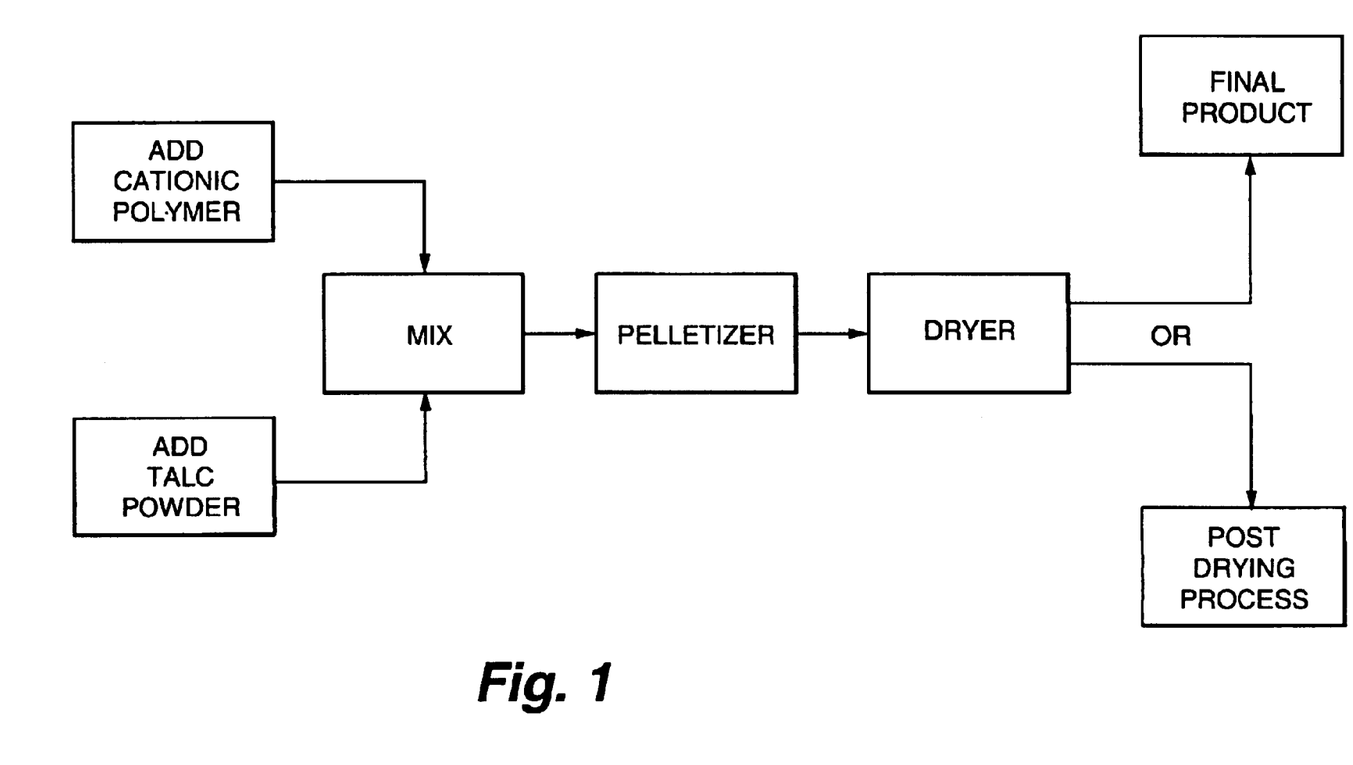
FIG. 1 is a flowchart of one embodiment of the additive process of the present invention.
Figure 2:
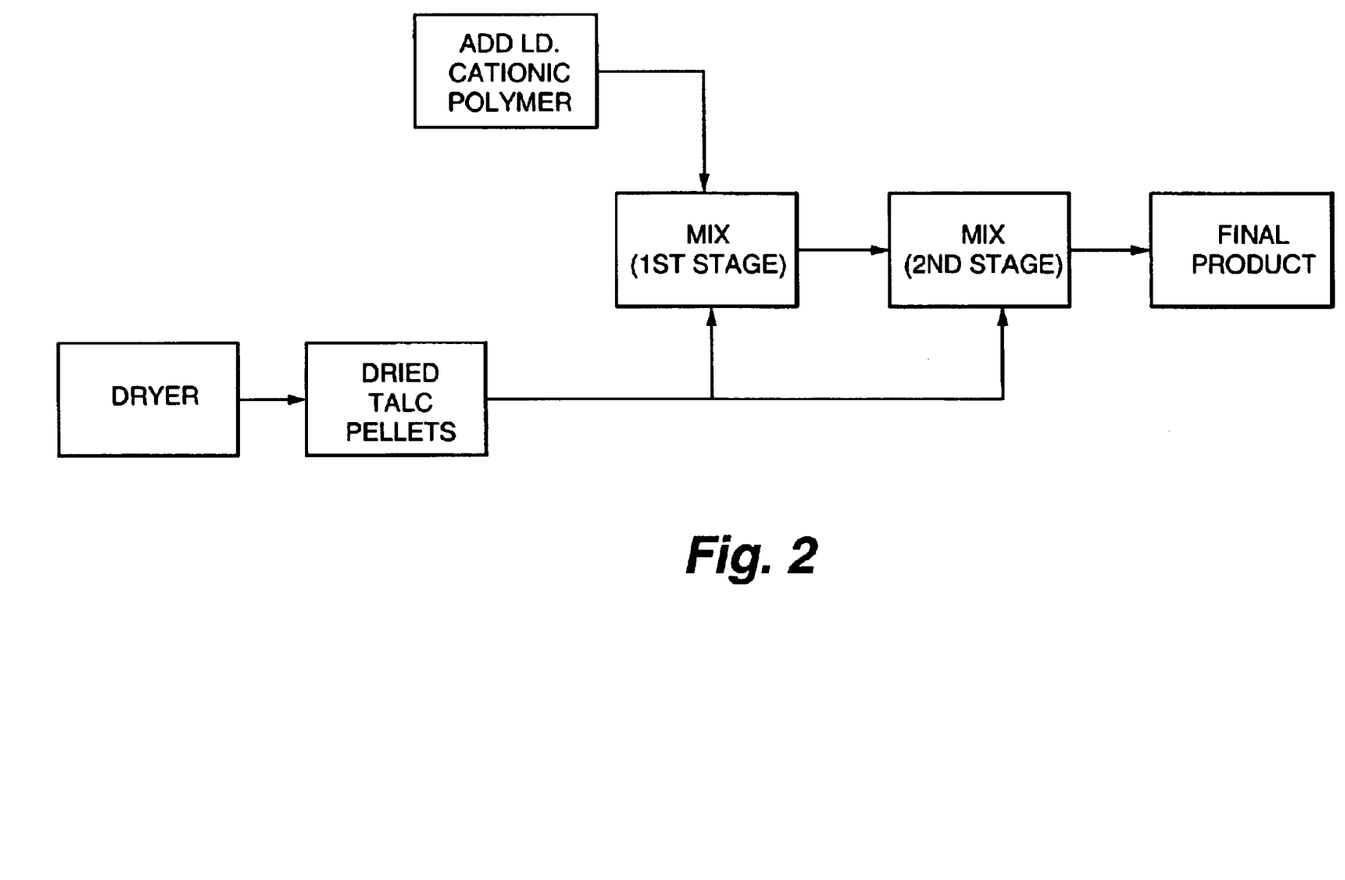
FIG. 2 is a flowchart of another embodiment of the additive process of the present invention.
Figure 3:
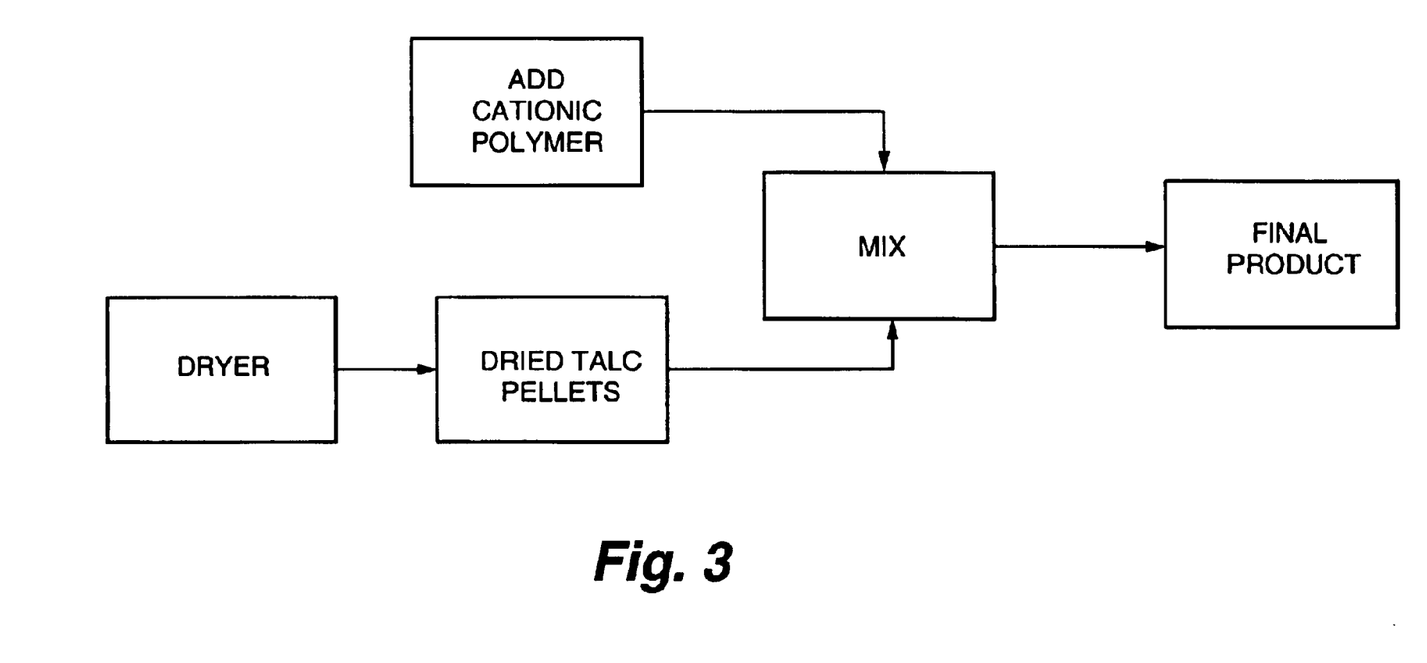
FIG. 3 is a flowchart of one embodiment of the additive process of the present invention.

FIG. 1 depicts an embodiment of a commercial process that can be used to produce a treated talc, such as that described by the present invention. The talc can be treated by adding the additives, either in liquid or dry form, prior to the drying stage or subsequent to the drying stage. FIG. 1 depicts an embodiment of a pre-dryer process while FIGS. 2 and 3 depict embodiments of a post-dryer process. In FIG. 1, untreated talc is mixed with a cationic polymer solution (typically an emulsion), fed into a pelletizer and dried. The variables for this process include but are not limited to solids of the cationic polymer, time in the mixed, time in the pelletizer, time and temperature in the dryer. Each of these variables are controlled.

FIG. 2 depicts an embodiment of the present invention that supplies the cationic polymer to the talc after the talc has been dried. In this embodiment, the cationic polymer should be in liquid form. The dried talc pellets are mixed with the cationic polymer, either in a one-stage as shown in FIG. 3 or multiple-stage mixing process as shown in FIG. 2.

EXAMPLES

The chemicals used throughout the examples discussed herein are shown in Table 1:

TABLE 1

Chemicals Used

| Product Name | Chemical | Supplier |
|---|---|---|
| Nalkat 2060 | Polyamine | Ondeo-Nalco |
| PRP 4440 | Polydadmac | Pearl River |
| Polymin SK | PEI | BASF |
| Mistron Plus (1.2%, active basis) | Polydadmac treated talc | Luzenac |
| Alcofix ® 159 | Cationic polymer | Ciba-Geigy |

Throughout the examples described herein, a standard procedure for admixing the talc particles with the polymer was conducted. The procedure is as follows: The polymer was added to 200 g of water with stirring. Seventy-five grams of dry talc was then added and the total weight of the solution was adjusted to 300 grams with deionized water. This resulted in a solids content of approximately 25 weight percent. Mixing was accomplished using a dispermat with a speed setting of 1000 rpm and a 5 minute mixing time.

Also throughout the examples described herein, a standardized procedure for adding the treated talc to the pulp slurry was conducted. This procedure is as follows: about 360 grams of bone-dry OCC pulp slurry was first adjusted to a 4 percent consistency with deionized water. This slurry was then poured into a water-jacketed mixer and stirred for about 30 minutes to raise the temperature of the slurry to about 50 to 52 degrees Celsius. The desired amount of treated talc was then added and mixed for 30 minutes. The treated pulp slurry was then mixed for 90 minutes at the same stirring speed. The temperature of the pulp slurry was maintained at about 55 degrees Celsius with a water jacket equipped with an immersion heater. After 90 minutes, mixing was stopped, and the stirrer was rinsed to remove fibers. The resultant slurry from rinsing the stirrer was collected and oven dried to a constant weight. The difference in weight represents the depositable material which is then converted to grams of depositable material per ton of pulp.

Example 1

The first experiment performed was to test a catonized talc, i.e., talc treated with only a polydadmac against a control and a conventional talc. An OCC pulp from a mill was used in this study. Four samples of pulp were prepared: one without talc (control), one with conventional talc, and two with cationized talc at different dosages. The results of the deposition testing described above are listed in Table 2.

TABLE 2

Results of Polydadmac Testing

| | Dosage | Depositable Material | |
|---|---|---|---|
| Treatment | (lbs of talc/ton OCC) | g/ton OCC | % Reduction |
| Control | 0 | 40 | 0 |
| Conventional talc (no polymer) | 40 | 41 | 0 |
| Mistron Plus | 20 | 31 | 22.5 |
| Mistron Plus | 40 | 13 | 67.5 |

The results show that the treated talc provides a reduction in stickies deposited on the stirrer. The results also show that the percent reduction increases with an increase in the amount of treated talc added to the OCC pulp. Thus, it is clear that a polydadmac treated talc will significantly reduce stickies.

While it is possible to add a polydadmac treated talc to an OCC pulp in the amounts shown above and such addition is specifically contemplated herein, cost is a factor which, in the practical world, should be considered. In addition to cost considerations, it is noted that the addition of 40 pounds of talc per ton of OCC pulp may affect other board properties such as strength, stiffness or coefficient of friction. Thus, while contemplated under the principles of the invention, the addition of this much talc may have other impacts, and, therefore, other chemistries were evaluated to determine whether other chemistries can provide the same benefits as the polydadmac treated talc.

Example 2

The polymers chosen to be evaluated in this example were polyamine (PA), polyethyleneimine (PEI), and polydadmac (PD). Since the three polymers have different molecular weights and other properties, a dosage level of each polymer that produce an identical talc particle charge of 15 $\mu$eq/g was used to treat the talc. To attain the desired particle charge, the polymers were added as follows:

| | |
|---|---|
| Polyamine: | 0.58% active |
| Polydadmac: | 0.62% active |
| PEI: | 0.93% active |

The polymers were added to the talc substantially according to the procedure described above. In the case of the PA and PD, the talc slurry was created without pH adjustment. However, the pH of the talc slurry with PEI was adjusted to a pH of about 5 with dilute sulfuric acid. The three polymers were compared in terms of their ability to control stickies at two talc dosage levels using an OCC pulp furnish. The results are shown in Table 3.

TABLE 3

Results of Comparison of PD, PA, and PEI

| | Dosage | Depositable Material | |
|---|---|---|---|
| Treatment | (Lbs of talc per ton of Pulp) | g/T Pulp | % Reduction |
| Control | 0 | 352.6 | 0 |
| PD | 20 | 327.4 | 7 |
| | 30 | 260.8 | 26 |
| PA | 10 | 202.3 | 43 |
| | 20 | 293.6 | 17 |
| PEI | 20 | 136.7 | 61 |
| | 30 | 153.9 | 56 |

The results of Example 2 clearly show that the PA or PEI treated talc at lower dosage levels provides the greatest reduction in stickies. The results also show that, in PD treated talcs, more talc is required to provide a greater reduction in stickies.

Example 3

Since the results of Example 2 clearly show that PA and PEI treated talcs reduces stickies, the next step was to optimize the polymer treatment in order to obtain a good balance between cationicity of talc edges and hydrophobicity of the planar surface of the talc particles. As discussed above, if too much amine is added to the talc particle slurry, the amine will turn the entire surface of the talc particles from anionic to cationic. Thus, an optimum range of cationic polymer to be added to the talc particles and also the optimum treated talc dosage to the recycled fibers were determined. This optimization study was conducted using PA instead of PEI for the following reasons (1) being a quaternary amine, PA's efficiency is not affected by pulp stock pH, unlike PEI, a tertiary amine, and (2) PA costs less than PEI. Different OCC pulps of varying levels of colloidal anionic trash and chemical oxygen demand (COD) were used to cover the broad spectrum of OCC pulp quality. The results of this determination are shown in Table 4.

TABLE 4

Talc Treatment Optimization

| Amine Dosage | Depositable Material | |
| --- | --- | --- |
| (Lbs/Ton of Talc) | g/ton of Pulp | % Reduction |
| 0 | 268 | 0 |
| 0.3 | 279 | 0 |
| 0.6 | 150 | 44 |
| 0.7 | 50 | 81 |
| 1.2 | 255 | 5 |

The results shown Table 4 indicate that, while the dosages above 0.3 lbs of amine per ton of talc will reduce the depositable material, dosages of approximately 0.4 to 1.0 provide the most significant reduction in depositable materials. A dosage of 1.2 lbs of amine per ton of talc resulted in a very slight reduction in depositable materials of 5% when compared to the control. Applicants believe that, at the high dosage of 1.2 lbs of amine per ton of talc, the cationic polymer may have covered a part of the planar hydrophobic surface of talc, causing a reduction in its efficiency.

Table 5 shows another example of the effect of polyamine dosage to talc on the reduction in depositable materials when using an OCC pulp having a hugher Murek charge and a higher COD than the OCC pulp used to generate the data in Table 4.

TABLE 5

Talc Treatment Optimization (Case 2)

| Amine Dosage | Depositable Material | |
| --- | --- | --- |
| (Lbs/Ton of Talc) | g/ton of Pulp | % Reduction |
| 0 | 268 | 0 |
| 0.9 | 197 | 27 |
| 1.2 | 110 | 59 |

A higher dosage of polymer to talc was required to attain greater than a 50% reduction in depositable materials. The higher dosage in Table 5 compared to Table 4 is due to higher Mutek charge and COD of the OCC pulp in Table 5. However, it is evident from these two examples that cationized talc is effective at reducing depositable materials in OCC furnish.

Example 4

This example shows the effect of treated talc dosage on the depositable materials at the same level of polymer treatment in Tables 6 and 7.

TABLE 6

Optimization of treated talc dosage (Illustration 1)

| Talc Dosage (lbs/dry ton of OCC) | Depositable Material | |
| --- | --- | --- |
| | g/ton of Pulp | % Reduction |
| 0 | 487 | 0 |
| 10 | 480 | 1 |
| 20 | 351 | 28 |
| 30 | 150 | 69 |

TABLE 7

Optimization of treated talc dosage (Illustration 2)

| Talc Dosage (lbs/dry ton of OCC) | Depositable Material | |
| --- | --- | --- |
| | g/ton of Pulp | % Reduction |
| 0 | 250 | 0 |
| 10 | 150 | 40 |
| 20 | 80 | 68 |

As shown clearly in Tables 6 and 7, a sufficient quantity of treated talc present in the OCC pulp suspension is effective. The amount of treated talc for a given resultdepends on the Mutek charge or anionicity of the system and the chemical oxygen demand.

Example 5

A comparison between treated talc and a pure cationic polymer (costing the same as the treated talc) was conducted. The results are shown in Table 8:

TABLE 8

Comparison Between Treated Talc and Cationic Polymer

| | Depositable Material | |
| --- | --- | --- |
| Treatment | g/ton of Pulp | % Reduction |
| Control | 487 | 0 |
| Cationic Polymer | 487 | 0 |
| Treated Talc (@ 0.6% active and 20 lbs/ton of OCC) | 150 | 69 |

The cationic polymer dosage was adjusted to equal the cost of the treated talc at 20 lbs per ton of OCC. No reduction in depositable material was observed when the cationic polymer alone was used without the talc. However, as Table 8 shows, a 69% reduction in depositable materials was observed when the treated talc was added.

Example 6

The effect of treated talc on paperboard properties was analyzed. Handsheets were prepared using a computerized MK former (miniature paper machine). The focus of the experiment was to compare handsheets without talc, as a control, to handsheets with talc at different dosages based on dry OCC fibers. Handsheets with a 32 lb liner basis weight were used in this experiment. Talc was treated with 0.6% active Nalkat 62060. The results of the experiment are shown in Table 9:

TABLE 9

Effects of Treated Talc on Paperboard Properties

| Properties | Control | Treated Talc at 10 lbs/ton of OCC | Treated Talc at 20 lbs/ton of OCC |
|---|---|---|---|
| Burst, psi | 53.8 | 53.3 | 54.6 |
| Tensile, N/mm | 6.32 | 6.33 | 6.31 |
| Stiffness, mg | 21.2 | 20.4 | 21.9 |
| Porosity, sec/100 cc | 14.5 | 16.1 | 23.5 |
| COF, Static | 0.49 | 0.51 | 0.46 |
| COF, Kinetic | 0.34 | 0.35 | 0.33 |

Fillers normally tend to reduce paper strength is applied in excess, however, the results show that adding treated talc at the different dosages did not negatively impact board properties. On the contrary, as shown in Table 9, treated talc improved sheet porosity, a desirable paper characteristic. Treated talc did not impact the coefficient of friction (COF). A low COF is undesirable for paperboards as it will cause the cartons or boxes, when stacked, to slide against each other and eventually fall from the stack, potentially damaging any contents.

Example 7

The charge stability of the treated talc over time was tested. The treated talc was produced using Nalkat 62060 at 0.6% active following the process depicted in FIG. 3. Table 10 shows the results of tests conducted during four weeks of storage.

TABLE 10

Charge stability of treated talc over time

| Week | 1 | 2 | 3 | 4 |
|---|---|---|---|---|
| Mutek ($\mu$eq/g talc) | 17.0 | 16.2 | 16.1 | 16.5 |

Thus, it is clear that the treated talc is stable over time.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing best mode of carrying out the invention should be considered exemplary in nature and not as limiting to the scope and spirit of the invention as set forth in the appended claims.

We claim:

1. A method for stickie control in recycled pulp, comprising:
   (a) contacting a tertiary or quaternary amine with talc particles in a ratio of tertiary or quaternary amine to talc particles to form a modified talc having both cationic sites and hydrophobic sites in an amount sufficient to control stickies; and
   (b) adding the modified talc to a recycled pulp.

2. The method for stickle control according to claim 1 wherein the modified talc is added to the pulp in an amount ranging from about 5 pounds per ton of recycled pulp fibers to about 30 pounds per ton of recycled pulp fibers.

3. The method for stickie control according to claim 1 wherein an amount of the tertiary or quaternary amine to be contacted with the talc is sufficient to attain a 15 $\mu$eq/g talc particle charge.

4. The method for stickie control according to claim 1 wherein the tertiary amine is polyethyleneimine.

5. The method for stickie control according to claim 1 wherein the quaternary amine is selected from the group consisting of polyamine and polydadmac.

6. The method for stickie control according to claim 1 wherein the quaternary amine is polyamine.

7. The method for stickie control according to claim 1 wherein the tertiary or quaternary amine is added to the talc in an amount greater than about 11.6 pounds of amine per ton of talc.

8. The method for stickie control according to claim 1 wherein the tertiary or quaternary amine is added to the talc in an amount ranging from about 11.6 pounds of amine per ton of talc to about 18.6 pounds of amine per ton of talc.

9. The method of claim 1, wherein the recycled pulp is dry old corrugated container (OCC) fibers.

10. A method for improving the efficiency of talc in reducing deposits on paper making equipment, comprising the steps of:
    a) contacting a cationic polymer with talc particles in a ratio of cationic polymers to talc particles to form a modified talc having both cationic sites and hydrophobic sites in an amount sufficient to control stickies; and
    (b) adding the modified talc to a recycled pulp.

11. The method for improving the efficiency of talc in reducing deposits according to claim 10 wherein the cationic polymer is a tertiary or quaternary amine.

12. The method for improving the efficiency of talc in reducing deposits according to claim 11 wherein the tertiary amine is polyethyleneimine.

13. The method for improving the efficiency of talc in reducing deposits according to claim 11 wherein the quaternary amine is selected from the group consisting of polyamine and polydadmac.

14. The method for improving the efficiency of talc in reducing deposits according to claim 11 wherein the quaternary amine is polyamine.

15. The method for improving the efficiency of talc in reducing deposits according to claim 11 wherein the tertiary or quaternary amine is added in an amount sufficient to attain a talc particle charge of about 15 $\mu$eq/g.

16. The method for improving the efficiency of talc in reducing deposits according to claim 11 wherein the tertiary or quaternary amine is added to the talc in an amount greater than about 11.6 pounds of amine per ton of talc.

17. The method for improving the efficiency of talc in reducing deposits according to claim 11 wherein the tertiary or quaternary amine is added to the talc in an amount ranging from about 11.6 pounds of amine per ton of talc to about 18.6 pounds of amine per ton of talc.

18. The method for improving the efficiency of talc in reducing deposits according to claim 10 wherein the talc is added to the pulp in an amount ranging from about 5 pounds per ton of recycled pulp fibers to about 30 pounds per recycled pulp fibers.

19. The method for improving the efficiency of talc in reducing deposits according to claim 10 wherein the pulp is added in an amount ranging from about 10 pounds per ton of recycled pulp fibers to about 20 pounds per recycled pulp fibers.

20. The method of claim 18, wherein the recycled pulp is dry old corrugated container (OCC) fibers.

21. A paper product having recycled pulp and a modified talc filler wherein the modified talc filler has a ratio of tertiary or quaternary amine to the talc to form a modified talc having both cationic sites and hydrophobic sites in an amount sufficient to control stickies.

22. A method for improving sheet porosity in paperboard, comprising:
  a) contacting a cationic polymer with talc particles in a ratio of tertiary or quaternary amine to talc particles to form a modified talc having both cationic sites and hydrophobic sites in an amount sufficient to control stickies;
  b) adding the modified talc to a recycled pulp furnish; and,
  c) processing the recycled pulp furnish create paperboard.

23. The method of claim 22 wherein the cationic polymer is a tertiary or quaternary amine.

24. The method of claim 22 wherein the cationic polymer is added in an amount sufficient to attain a talc particle charge of about 15 $\mu$eq/g.

* * * * *

UNITED STATES PATENT AND TRADEMARK OFFICE
CERTIFICATE OF CORRECTION

PATENT NO. : 6,977,027 B2
DATED : December 20, 2005
INVENTOR(S) : Shripal Sharma et al.

It is certified that error appears in the above-identified patent and that said Letters Patent is hereby corrected as shown below:

<u>Title page,</u>
Item [73], Assignee, delete "Luzenae", and replace with -- Luzenac --.

Signed and Sealed this

Twenty-eighth Day of March, 2006

JON W. DUDAS
*Director of the United States Patent and Trademark Office*